Figure 1:
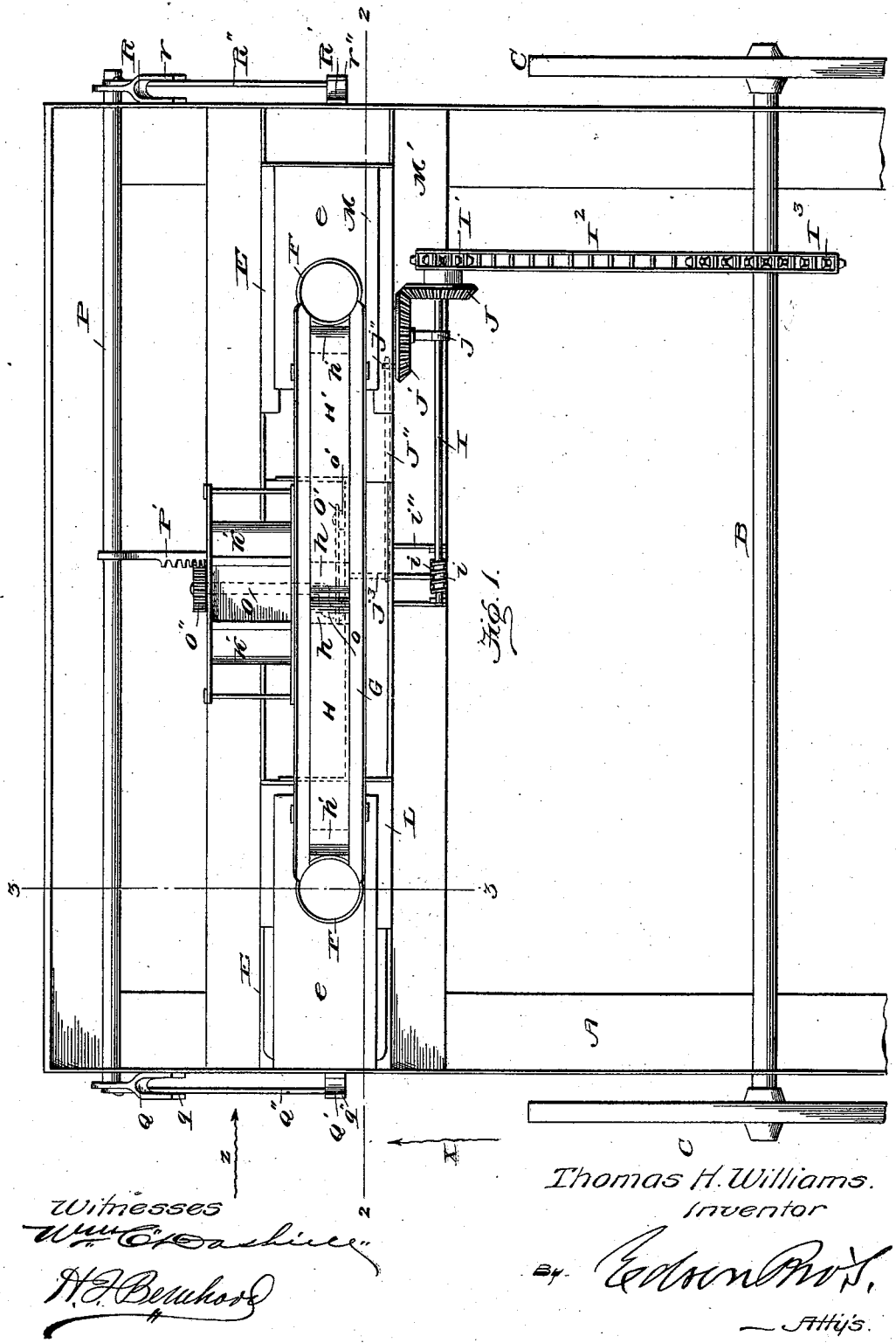

(No Model.)  3 Sheets—Sheet 1.

T. H. WILLIAMS.
CHECK ROW POTATO PLANTER.

No. 568,651. Patented Sept. 29, 1896.

Witnesses

Thomas H. Williams.
Inventor (No Model.)                    T. H. WILLIAMS.                 3 Sheets—Sheet 2.
                           CHECK ROW POTATO PLANTER.
No. 568,651.                                    Patented Sept. 29, 1896.
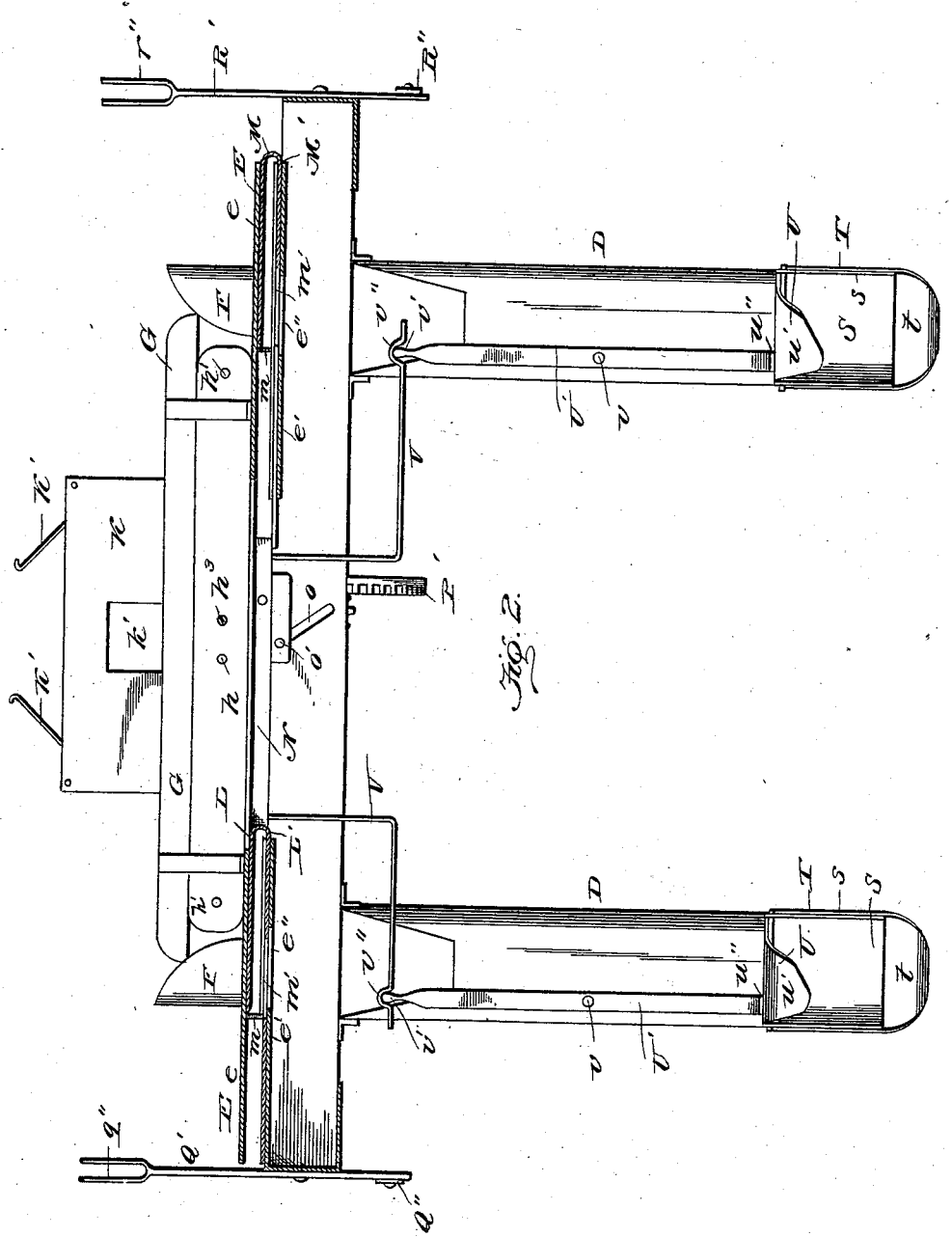

(No Model.) 3 Sheets—Sheet 3.
T. H. WILLIAMS.
CHECK ROW POTATO PLANTER.
No. 568,651. Patented Sept. 29, 1896.
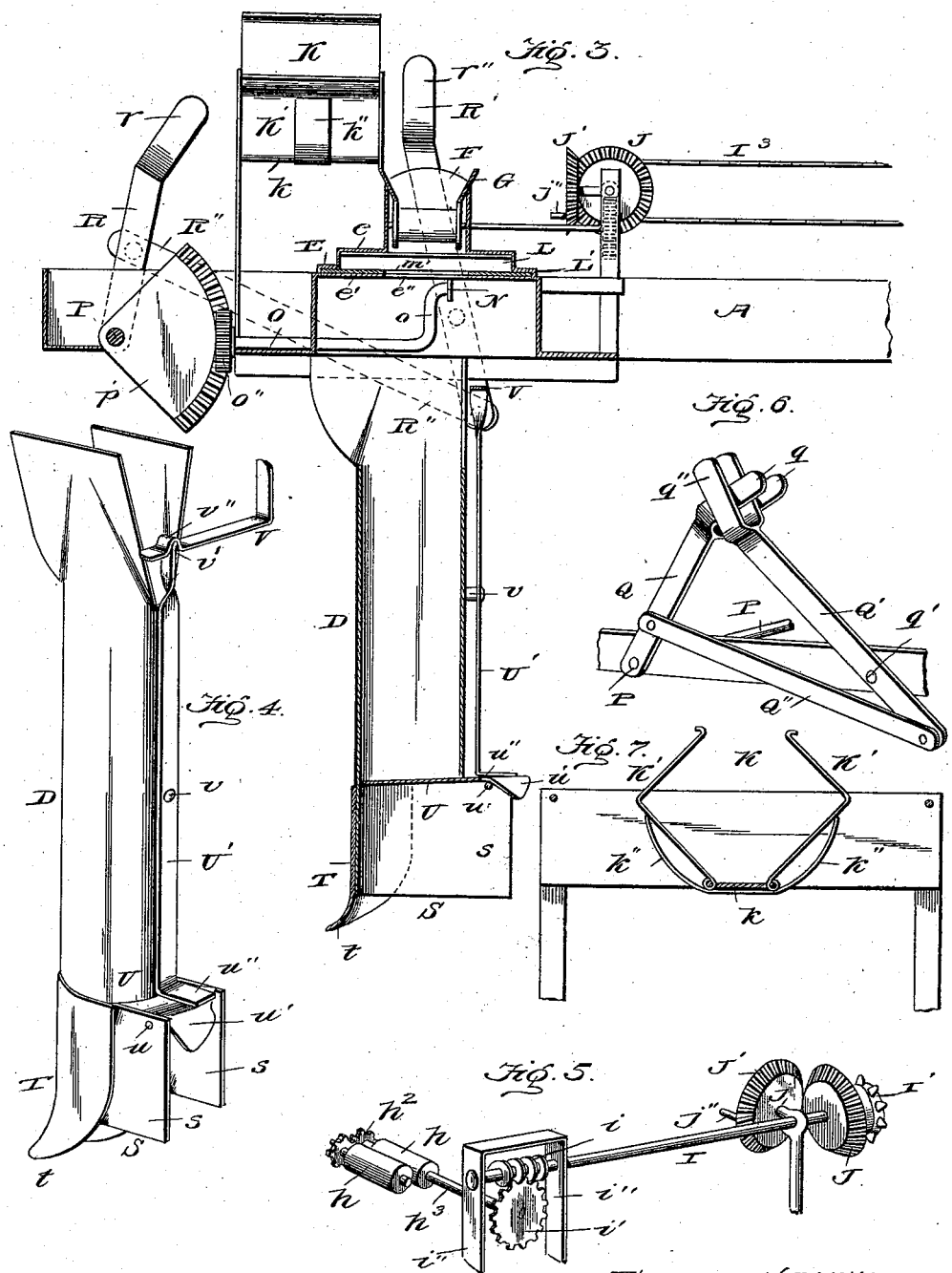
Witnesses:
Thomas H. Williams, Inventor

UNITED STATES PATENT OFFICE.

THOMAS H. WILLIAMS, OF DOLAND, SOUTH DAKOTA.

CHECK-ROW POTATO-PLANTER.

SPECIFICATION forming part of Letters Patent No. 568,651, dated September 29, 1896.

Application filed May 16, 1896. Serial No. 591,860. (No model.)

*To all whom it may concern:*

Be it known that I, THOMAS H. WILLIAMS, a citizen of the United States, residing at Doland, in the county of Spink and State of South Dakota, have invented certain new and useful Improvements in Check-Row Potato-Planters; and I do hereby declare the following to be a full, clear, and exact description of the invention, such as will enable others skilled in the art to which it appertains to make and use the same.

My present invention relates to improvements in potato-planters in which I have provided mechanism which may be used to operate the cutting and dropping devices either in connection with a check-wire or similar to a drill-planter.

A further object of my invention is to provide an improved cutter and valve mechanism in which the cutting of the potatoes is effected while the connected cutters operate in one direction and in which the dropping of the potatoes is effected on the movement of the cutters and valves in the reverse direction.

A further object of my invention is to provide a novel arrangement of the arms and fingers to engage with the knobs of the check-wire by which each knob is made to actuate the two arms or fingers for the purpose of giving the cutter dropper-plates the proper reciprocating play.

A further object of my invention is to provide a novel construction of the hoe and boot by which the potatoes may be properly deposited in the ground and the soil of the furrow allowed to fall over and cover the potato after it has been deposited in the furrow made by the hoe.

A further object of my invention is to provide a hinged flap-valve in the lower part of the drill-tube, which flap-valve is actuated automatically and in synchronism with the cutter and dropper devices by mechanism controlled from the reciprocating bar that actuates the duplex cutter and valve devices.

A further object of my invention is to so connect the lever, which controls the flap-valve, to the reciprocating bar that the lever and bar will be readily uncoupled or disconnected without destroying or breaking any of the parts in case the hoe or drill strikes a stone or obstruction in the path.

A further object of the invention is to provide an improved construction of the hopper designed to properly feed the potatoes to the trough in which operates the conveyer-aprons that supply the potatoes to the duplex cutter and valve devices.

To the accomplishment of these ends my invention consists in the novel combination of devices, and in the construction and arrangement of parts, which will be hereinafter fully described and claimed.

To enable others to understand my invention, I have illustrated the same in the accompanying drawings, forming a part of this specification, and in which—

Figure 1 is a plan view of my potato-planter. Fig. 2 is a vertical sectional elevation taken transversely through the machine on the plane indicated by the dotted line 2 2 of Fig. 1, looking in the direction indicated by the dotted line X. Fig. 3 is a vertical sectional view at right angles to Fig. 2 and on a plane through one of the drill-tubes, indicated by the dotted line 3 3 of Fig. 1, looking in the direction indicated by the arrow Z in Fig. 1. Fig. 4 is a detail perspective view of one of the drill-tubes, illustrating the hoe and boot thereof, the flap-valve, the lever for actuating the flap-valve, and the joint connecting the lever and arm which is attached to the reciprocating bar for the cutter and dropper plates. Fig. 5 is a detail view of the gearing by which the conveyer-aprons are actuated. Fig. 6 is a detail perspective view of one set of the levers and fingers to engage with a knotted check-wire for the purpose of operating the reciprocating bar and the duplex cutter and valve plates. Fig. 7 is a detail view of the hopper having the spring-controlled flaps to effect the discharge of the potatoes to the conveyer-aprons.

Like letters of reference denote corresponding parts in all the figures of the drawings.

In some respects the machine forming the subject of my present invention is similar to the potato-drill patented to me on the 4th day of February, 1896, No. 554,015; but in my present invention I have provided mechanism by which the machine may be operated to plant in check-rows across the field. I have modified the cutting and dropping devices so that the cutting of the potatoes and the dropping of the potatoes shall take place simultaneously in the two drill-tubes instead of alternately, as in my prior machine, and I have also made various additional improvements which tend to increase the efficiency of the machine.

In the drawings, A denotes the main or carrying frame.

B is the axle, and C are the carrying-wheels, of any approved construction.

Near opposite sides of the main frame I have provided the drill-tubes D D, and over these tubes are placed the guides or supports E E. These supports have the top and bottom plates $e\ e'$, which are spaced and constructed with guideways to receive the cutter and valve plates, or the supports or guides may be in the form of blocks suitably constructed to receive the cutter and valve plates, as in my prior patent. In the bottom $e$ of each support or guide is a discharge-aperture $e''$, which lies immediately above and in line with one of the tubes D, in order that the piece of potato may be dropped through the opening $e''$ in the support or guide into the tube D, and each support or guide is further provided with an upwardly-extending tube F F. The tubes F F have their inner or facing sides beveled or cut away to enable the trough G and the aprons H H' to fit close up to the tubes F F in order to properly deposit the potatoes in the guide-tubes F F. This trough occupies a horizontal position across the machine-frame and between the two guide-tubes F and the supports E, and in the bottom of this trough is arranged the oppositely-moving aprons H H', each of which extends about one-half the length of the trough. Each apron is supported at its inner end on a roller $h$ and at its outer end on a roller $h'$, and the inner rollers $h\ h$ of the two aprons are geared directly together by the gears $h^2\ h^2$, secured on the shafts of the rollers $h\ h$, whereby the rollers $h\ h$ are caused to rotate in opposite directions and the aprons H H' are likewise caused to travel in opposite directions and toward the tubes F F.

The means for driving the aprons consist in a driving mechanism which is geared to the axle B, and in the drawings I have shown the driving mechanism as consisting of the shaft I, carrying the worm $i$, the crown-gear $i'$, the sprocket-wheel I', the sprocket-chain I², and the sprocket-wheel I³. The sprocket-wheel I³ is fixed to the axle of the machine, the sprocket-wheel I' is secured to one end of the shaft I, and the sprocket-chain is arranged to engage with the wheels I' I³ to transmit motion from the axle B to the shaft I. This shaft I is arranged transversely across the machine to one side of the trough G, and it is journaled in suitable bearings in the standards $i''$. The shaft $h^3$ of one of the apron-driving rollers $h$ is extended to one of the standards $i''$, and on said shaft $h^3$ is secured the crown-wheel or gear $i'$, which meshes with the worm $i$ on the shaft I, so that the shaft I is adapted to rotate the shaft $h^3$ and, through the gearing $h^2$, to rotate the rollers $h\ h$, thus giving the requisite motion to the aprons H H'. In connection with this driving-gear I have provided the intermeshing bevel-gears J J', one of which gears, J, is secured to the shaft I to rotate therewith, while the other gear, J,' is mounted on a short stub-axle $j$, attached to one of the standards $i''$. The gear J' is provided with a wrist-pin $j''$, and to this wrist-pin is adapted to be attached one end of a pitman J'', (indicated by dotted lines in Fig. 1,) which pitman J'' is to be attached to a pin or stud $j^3$ on the reciprocating bar which connects the duplex cutter and dropper plates whenever it is desired to use the machine as a drill-planter and to operate the cutter and dropper plates by the described gear and shaft connections with the axle of the machine. In using the machine as a check-row planter it is to be understood that I omit this pitman connection J'' between the shaft I and the reciprocating bar of the cutter and dropper plates and employ the driving mechanisms simply as a means for operating the conveyer-aprons H H'.

K designates the hopper, which is suitably supported on the carrying-frame in juxtaposition to the trough G at the middle thereof and in a raised or elevated position at one side of the trough, as shown. This hopper has a short fixed bottom section $k$, and in the side of the hopper next to the trough is an opening $k'$, through which the potatoes roll or are discharged onto the carrying-aprons H H' in the bottom of the trough G. This hopper K is constructed with yieldable wings K' K', which form the end walls of the hopper, and which are normally forced by the springs $k''$ or their equivalents inward toward each other. These movable side wings are made with inclined walls, and they are hinged or pivotally joined to the bottom of the hopper in any suitable way, so that the wings occupy inclined positions, whereby when the planter is in motion and the yieldable wings are subjected to jar and vibration the potatoes are caused to roll out of the hopper through the opening $k'$ and upon the aprons H H'. Although I have shown the inclined side wings of the hopper as maintained in place by the springs, yet I do not restrict myself to the use of springs, as I am aware that equivalent adjusting devices, such as set-screws or levers, may be employed to give the proper inclination or adjustment to the wings of the hopper. The movable wings in the hopper are considered to possess practical advantages, as the hopper occupies such an elevated position that without the movable wings the hopper, when loaded, would swing or tilt the machine.

L L' designate one set of cutter and valve plates, and M M' designate the other set of cutter and valve plates. The connected cutter and valve plates L L' are fitted or arranged to operate in one of the guides or supports E, while the other connected cutter and valve plates M M' are fitted or arranged to operate in the other support or guide E. These two pairs of plates are joined or coupled together by the bar N, which is rigidly fastened to the two sets of plates in any suitable way, and to this bar N is imparted motion by which the two sets of plates are caused to reciprocate in the supports or guides E E. The upper plates L M are the cutter-plates, and they are arranged close to the under side of the tops $e$ of the supports E, so as to cut off pieces of the potatoes deposited in the tubes F F, and the cutting edges of these two plates L M both face in the same direction, or toward the left-hand side of the machine, so that the two plates L M are adapted to cut two slices or pieces off the two potatoes in the tubes F at the stroke of the plates L M and the bar N toward the left of the machine. The lower plates L' M' are the valve-plates, and they are longer than the cutter-plates and are arranged below the cutter-plates to provide spaces between themselves and the cutter-plates to receive the pieces sliced off the potatoes by the cutter-plates, said valve-plates having the abutments $m$ and the apertures $m'$, which are so positioned that the pieces of potatoes cut by the plates L M and deposited on the valve-plates L' M' will drop through the openings $m'$ $m'$ when the bar N and the two sets of plates are moved back to bring the openings $m'$ in the valve-plates into line with the openings $e''$ in the bottoms $e'$ of the supports E, whereby the plates L' M' are caused to drop the cut pieces of potato into the tubes D D.

The mechanism for operating the bar N and the two sets of cutter and valve plates by knotted check-wire stretched across a field consists of a crank-shaft O, a rock-shaft P, and two pairs of arms Q Q' and R R', the detailed construction and arrangement of which parts are as follows: The crank-shaft O lies in a plane at right angles to the reciprocating bar N, and it is journaled in a suitable bearing on the main carrying-frame. At one end this shaft O has a crank $o$, to which is connected the pitman O', and this pitman O' is also connected to a stud or pin $o'$ on the reciprocating bar N, the shaft O and bar N being thus operatively connected together. The other end of the shaft O opposite the crank $o$ is furnished with a bevel gear-pinion O'', which meshes with the beveled gear-teeth on a segment or quadrant P', which is fastened to the rock-shaft P, and said shaft P extends across and is journaled in suitable bearings on the main carrying-frame A. The ends of the rock-shaft P are projected beyond the sides of the frame, and to said shaft are rigidly fastened the arms or bars Q R. These bars extend upward from the shaft P and the frame A for a suitable distance, and at their upper free ends said arms have the bifurcated or forked fingers $q\,r$, which are yieldable or elastic to permit of the passage of the knot on the check-wire. With the arm or bar Q is combined the companion arm Q', which is hung or pivoted at an intermediate point of its length on the frame A, as at $q'$, and the pair of arms Q Q' are coupled together by means of the link Q'' in a manner to insure simultaneous movement to said arms in opposite directions, that is to say, by connecting the pitman to the arm Q' below the fulcrum and by attaching the pitman to the arm Q above its fulcrum, which in this case is the rock-shaft P. The arm Q' has its free end forked or bifurcated to form the fingers $q''$, and these arms Q Q' are so arranged that when the arms are thrown toward each other the fingers $q\,q''$ will interlock or embrace and the fingers $q''$ of the arm Q' will lie in the path of the knot on the check-wire. As the machine is drawn across the field the check-wire plays through the fingers $q\,q''$ of the arms Q Q' until a knot on the check-wire strikes the fingers $q$ of the arm Q, which turns or throws the arm Q to an inclined position, and during this turning movement of the arm Q it rocks the shaft P and the shaft O to move the bar N and two sets of plates in one direction to cause the plates L M to cut the potatoes, and at the same time the bar Q draws on the link Q'' and throws the arm Q' toward the arm Q, thus causing the fingers $q''$ of the bar Q' to cross the fingers $q$ of the arm Q and also lie in the path of the knot on the check-wire, so that the knot on the check-wire as the machine continues to advance pulls against the finger $q''$ and moves the arm Q' to an upright position. This movement of the arm Q' forces the link Q'' to return the arm Q to its upright position, and the shaft P is thus rocked in the reverse direction and turns the shaft O to throw the crank and move the bar N and the two sets of plates, whereby the pieces of potato cut by the plates L M on the previous stroke, the plates L M, and bar N will be deposited in the tubes D. The other set of arms R R' on the opposite side of the machine are arranged and constructed similarly to the arms Q Q', that is to say, the arm R is fastened to the rock-shaft P and provided with the fingers $r$, the arm R' is pivoted to the frame A and provided with fingers $r''$, and the two arms R R' are connected by the link R'', attached to the arms R R', in the same way as the link Q'' is attached to the arms Q Q'.

The object in having the two sets of arms Q Q' and R R' on opposite sides of the machine is to work the planting mechanism when the machine is turned around at the end of each row.

The drill-tubes D are connected or attached to the planter-frame in the usual way familiar to persons skilled in the art to which my invention relates, and each tube is provided with the boot S. The boot has a curved front side and it has straight parallel walls s s, which are extended rearwardly from the back side of the tube D, said boot being secured to the tube in any suitable way. The hoe or furrow-opener T is fastened to the boot or tube, and the prow t of the hoe is extended below and in advance of the boot, so as to properly open the furrow.

The flap-valve U consists of a plate which is fitted between the parallel sides s of the boot, and it is hung thereto by means of the pin or arbor u, suitably supported in the walls s. This flap-valve is constructed or shaped to lie across the boot S and tube D when it is raised and thereby close the tube and retain the piece of potato until the proper time comes for dropping the potato into the furrow. The opening of the flap-valve is automatically effected. This valve U is hung eccentrically by the arbor u, so that it will drop and open by gravity when free from the restraint of the lever U', and the rear part of said flap-valve is bent or curved to present an eccentric or cam-shaped surface $u'$ to the foot $u''$ of the actuator-lever U'. This actuator-lever U' is hung or fulcrumed at an intermediate point of its length by means of a bolt v, attached to the tube D, and this lever is arranged in an upright position alongside of the tube D, so that the foot $u''$ thereof can ride against the cam-surface $u'$ of the flap-valve and to enable the upper end of the lever U' to be attached or coupled to one arm V, carried by the reciprocating bar N. This arm V is of angular form and one end is rigidly fastened to the bar N, while the other end of the arm V is connected to the upright lever U' by a peculiar form of joint which permits the lever U' and arm V to readily disengage should the hoe or tube strike an obstruction, and thereby obviate breakage or damage to the parts. This joint or coupling is formed by making a transverse loop $v''$ in the free end of the arm V and by forming a head $v'$ on the upper end of the lever U', which head is fitted snugly in the loop $v''$, so that the lever will partake of the movements of the arm V in a path at right angles across the line of movement of the machine; but when the hoe and tube strike an obstruction and yield or give to the same, as is usual in this class of machines, it will be seen that the lever U', which is fulcrumed to and carried by the tube D, will move with the tube and its head $v'$ will be drawn or moved in a direction to free it from the loop $v''$ of the arm V, thus uncoupling the arm and lever U' without breaking any of the parts. The lever and arm may be easily connected when the parts are restored to normal position.

As the bar N is moved to the left and the plates L M slice the potatoes the arms V are moved with the bar N and throw the levers U' to positions where the feet of the levers are clear of the cam-surfaces on the flap-valves, and these valves thus drop or fall so as to open the tubes D. As the bar N is reversed, to withdraw the cutter-plates L M and move the valve-plates L' M' into positions to drop the potatoes into the tubes D, the arms V move the levers U' and force the feet to ride against the cam-surfaces of the flap-valves, thus raising the flap-valves and causing them to catch and retain the potatoes. On the next stroke of the bar N to the left, to make the plates L M again cut the potatoes, the arms V again move the levers U' to clear the flap-valves and allow them to deposit the potatoes into the furrows.

The hoes open the furrows to receive the potatoes and the side walls of the boot serve to keep the soil away from the potatoes at the instant they are dropped, but as the machine travels the loosened soil held back by the boots is free to fall back into the furrow and cover the potatoes.

It is thought that the operation and advantages of my improved machine will be readily understood from the foregoing description taken in connection with the drawings.

I am aware that changes and alterations in the form and proportions of parts and in the details of construction of the devices herein shown and described as the preferred embodiment of my invention may be made by a skilled mechanic without departing from the spirit or sacrificing the advantages thereof, and I therefore reserve the right to make such modifications as fairly fall within the scope of my invention.

Having thus fully described my invention, what I claim as new, and desire to secure by Letters Patent, is—

1. In a potato-planter, the combination with duplex cutting and dropping mechanisms, and conveyer-aprons to supply potatoes to said duplex mechanisms, of a check-wire-operated mechanism to give motion to the cutting and dropping mechanisms, and an independent driving device impelled from the machine-axle and geared with the conveyer-aprons to impart motion thereto independently of the operation of the cutting and dropping mechanisms, as and for the purposes described.

2. In a potato-planter, the combination with a reciprocating bar for operating cutter and dropper devices, of a rock-shaft P, a shaft O operatively connected with said reciprocating bar and with the rock-shaft, rocking arms arranged to be engaged with a check-wire, one of said arms being attached to the rock-shaft, and means connecting said rocking arms to insure simultaneous movement thereto in opposite directions, as set forth.

3. In a potato-planter, the combination with a reciprocating bar for operating the cutting and dropping devices, of a pair of arms having fingers to engage with a check-wire, a link connecting the arms to insure opposite movement thereto simultaneously, and connections between one of said arms and the reciprocating bar, as and for the purposes described.

4. In a potato-planter, the combination with a reciprocating bar operating the cutter and dropper devices, of a crank-shaft linked to said bar, a rock-shaft geared to the crank-shaft, an arm fixed to the rock-shaft and having the fingers, a pivoted arm also provided with fingers, and a link connecting the two arms, as and for the purposes described.

5. In a potato-planter, the combination with dropper devices, and conveyers for delivering potatoes to said dropper devices, of an elevated hopper having a side delivery to deposit the contents of the hopper upon the conveyers, said hopper also provided with wings which are impelled normally toward each other, for the purposes described.

6. In a potato-planter, the combination with dropper devices, and suitable conveyers, of an elevated hopper having a delivery-opening, the pivoted wings which are inclined relatively to the delivery-opening, and springs which normally impel said wings toward each other, as set forth.

7. In a potato-planter, the combination with a trough, and endless conveyers operating therein, a roller of one conveyer provided with a crown-gear on its shaft, a counter-shaft I provided with a worm which meshes with said crown-gear, and connections between said shaft I and the machine-axle, as and for the purposes described.

8. In a potato-planter, the combination with a reciprocating bar, and a tube, of an eccentrically-pivoted flap-valve provided with a cam-surface, a lever arranged to ride against the cam-surface, and an arm carried by said bar for moving the lever into and out of engagement with the flap-valve, as set forth.

9. In a potato-planter, the combination with a reciprocating bar, and a tube, of a flap-valve, an arm carried by the bar, and a valve-operating lever coupled with said arm by a separable joint, as and for the purposes described.

10. In a potato-planter, the combination with a bar, and a tube, of a flap-valve, an arm carried by the bar, a valve-operating lever carried by said tube, and a separable joint between the arm and lever which insures play of the lever with the arm in a plane across the line of travel of the machine but which permits ready disengagement of the lever and arm when the tube is moved out of position by an obstruction in its path, as and for the purposes described.

11. In a potato-planter, the combination with a tube, of the boot having the round front side and the straight walls which extend rearwardly from the tube, a flap-valve hung in the walls of the boot, and means for opening or closing the flap-valve, as set forth.

In testimony whereof I affix my signature in presence of two witnesses.

THOMAS H. WILLIAMS.

Witnesses:
JOSIAH WILSON,
R. A. MATHER.